Jan. 24, 1967  L. W. ALVAREZ  3,299,768
OPTICAL RANGE FINDER WITH VARIABLE-ANGLE EXPONENTIAL PRISM
Filed Aug. 16, 1962  3 Sheets-Sheet 1
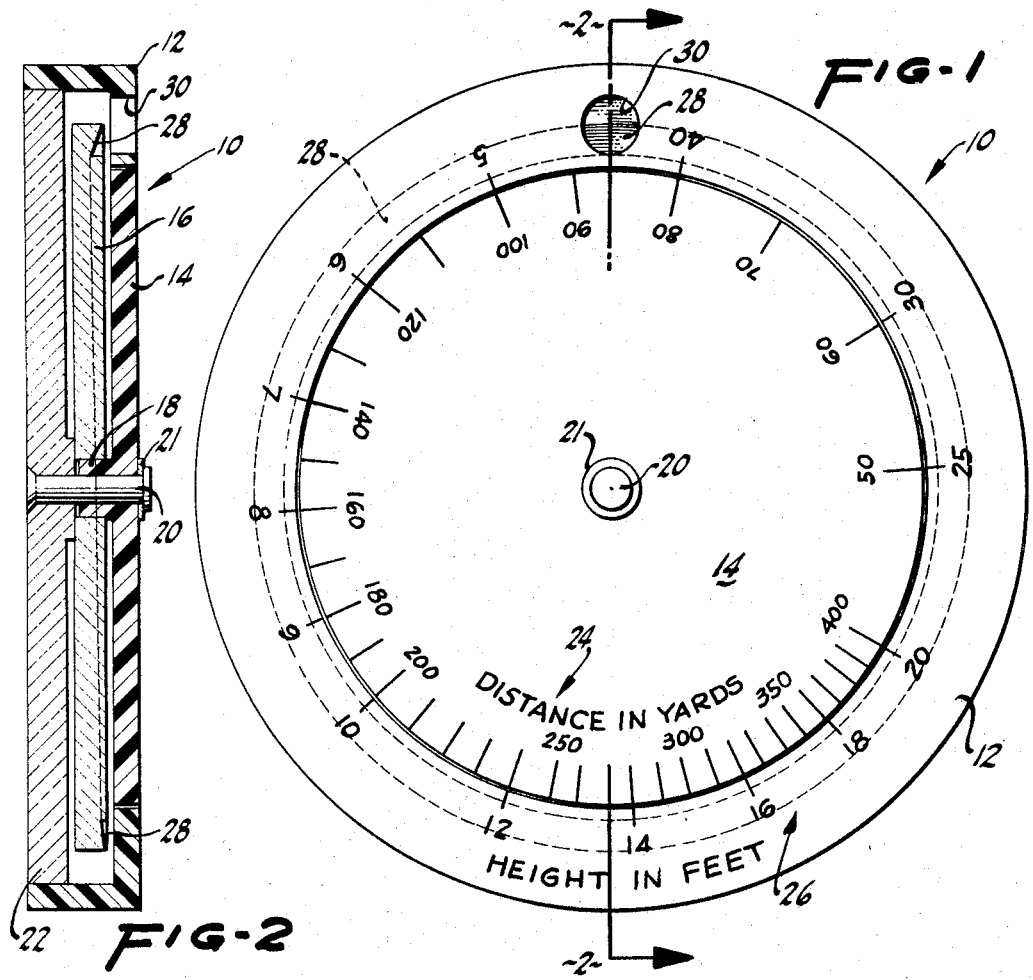
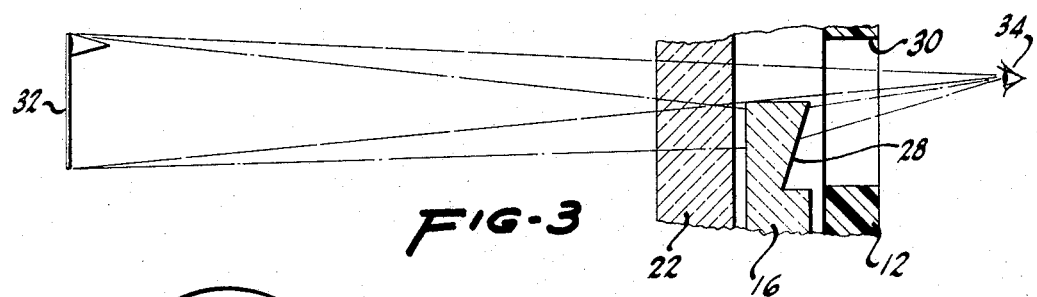
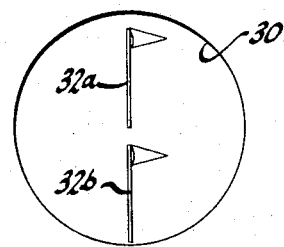
INVENTOR.
LUIS W. ALVAREZ
BY
Lippincott, Ralla & Hendrickson
ATTORNEYS Jan. 24, 1967  L. W. ALVAREZ  3,299,768
OPTICAL RANGE FINDER WITH VARIABLE-ANGLE EXPONENTIAL PRISM
Filed Aug. 16, 1962  3 Sheets-Sheet 2

INVENTOR.
LUIS W. ALVAREZ
BY
Lippincott, Ralls & Hendrickson
ATTORNEYS

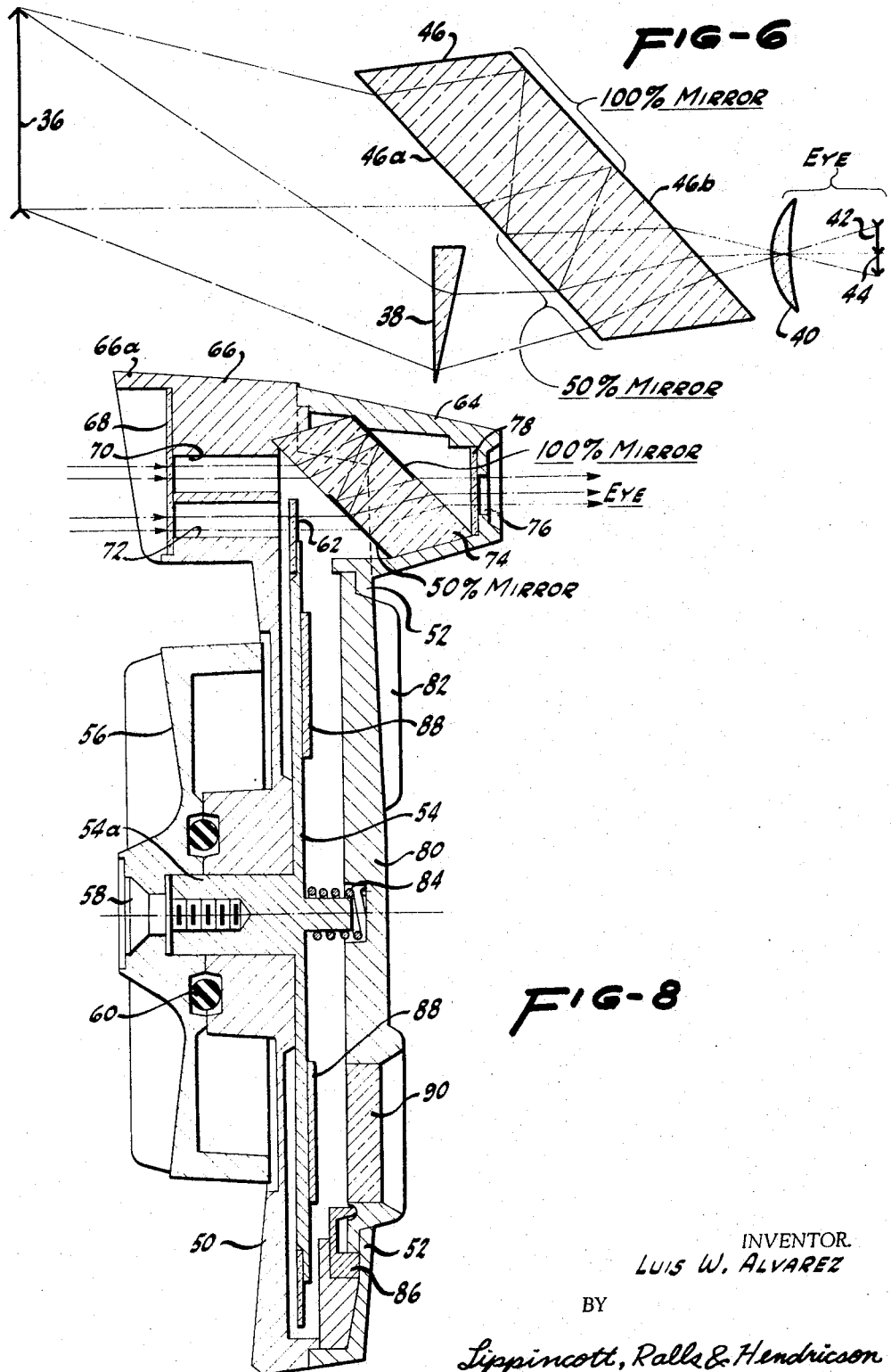

United States Patent Office 3,299,768
Patented Jan. 24, 1967

3,299,768
OPTICAL RANGE FINDER WITH VARIABLE-ANGLE EXPONENTIAL PRISM
Luis W. Alvarez, Berkeley, Calif., assignor to Optical Research and Development Corp., Oakland, Calif., a corporation of California
Filed Aug. 16, 1962, Ser. No. 217,386
5 Claims. (Cl. 88—2.4)

This invention relates to an optical range finder of the type using the height or other visible known dimension of a distant object as a base line for determining the distance to that object.

In many activities, including but not restricted to sports such as golfing, hunting, hiking, and the like, there is need or a small, inexpensive, and easily operated range finder. Prior range finders do not meet the conflicting requirements of small size and accuracy at distances up to several hundred yards or more; for example, optical range finders of the type extensively used in photography, which employ as a base line the distance between two optical elements within the range finder itself, cannot accurately measure the distances encountered in golf without unreasonably increasing the size of the range finder. A principal object of this invention is to provide a range finder that satisfies the described need.

The range finder herein described is useful for measuring distances to objects that have a visible known dimension, which can be used as a base line. In golfing, one may use the height of the conventional flag on the green as a base line for measuring one's distance from that flag, or one may use the known or estimated height of another golfer as the base line. Because of the common occurrence of objects having a height, length, or other visible dimension that is known, or can be estimated with fair accuracy, this improved range finder has a wide field of utility; and because objects of appropriate size to give a base line of four to ten feet or more are fairly common, this range finder has an accuracy that cannot be matched by other small, inexpensive, optical range finders. In the description that follows, the height of the distant observed object will be used as the base line; it is considered too obvious to require further explanation that length, or other visible known dimensions, may be used in appropriate cases.

According to this invention, the improved range finder employs a prism having an angle between its faces that varies as an exponential function of distance along an edge of the prism. A sight is so arranged that, upon looking through the sight, the user can see two images of a distant object simultaneously: one image seen through a portion of the variable-angle prism and another image seen directly without intervention of the prism. These two images are displaced from one another by an amount that depends upon the angle between those portions of the prism's faces that are in alignment with the sight; thus, by moving the sight with respect to the prism lengthwise of the prism's edge, displacement between the two images seen by the user is varied and a position may be found at which the foot of one image appears to rest upon the head of the other. At this point the angle of the prism has a fixed relation to the ratio between the height of the observed object and its distance from the observer, the angle of deviation of light rays passing through the prism being equal to the angle subtended by the object at the observer. The user determines the distance by consulting a pair of cooperating logarithmic scales, which are so coupled to the variable-angle prism and the sight that the two scales move relative to each other in proportion to movement of the sight relative to the prism. One scale is marked with distances and the other scale is marked with heights. If the user knows the height of the observed object, to a certain degree of accuracy, he can immediately determine the distance of that object to substantially the same degree of accuracy. It will be appreciated that this simple, straight-forward use of cooperating logarithmic scales is made possible by the exponential variation in the angle of the prism.

In preferred embodiments of this invention, the variable-angle prism is annular, the angle of the prism is oriented in the radial direction, and the sight moves with respect to the prism in a circle extending around the outside edge of the annulus. Letting $\alpha$ represent the angle of the prism and $\theta$ represent angular position around the annulus, the prism angle can be expressed by the equation $$\alpha = ae^{b\theta}$$

in which $a$ and $b$ are constants chosen such that the prism angle varies over a range of values appropriate to the range of distance-height ratios for which the range finder is designed. In the specific embodiments hereinafter described $b$ is chosen such that $\alpha$ changes by a factor of 10 when $\theta$ changes by 360°, and $a$ is chosen such that distances in the order of 40 to 400 yards can be measured with objects in the order of 4 to 10 feet high. The entire range finder is incorporated in a small, flat, circular case, wherein distances and heights are indicated by cooperating circular scales, one marked upon a disk that rotates in unison with the annular prism and the other marked upon a reference part, which may be a portion of the case.

In one embodiment of the invention herein illustrated and described, the sight is a simple hole or window, preferably about two or three millimeters in diameter, centered over the outside edge of the annular prism, whereby the user, looking through the sight hole, sees light rays from distant objects passing directly to his eye through the top half of the sight hole, and light rays bent by the variable-angle prism passing through the lower half of the sight hole. Thus, the user sees two images of the same distant object, one image being displaced from the other by an amount related to the angle of the prism. However, for reasons more fully discussed hereinafter, this simple embodiment is subject to a possible error associated with changes in the focus of the eye. The difficulty is avoided, in a second and preferred embodiment herein described, by the use of a combining prism, which combines the rays of light that pass above the variable-angle prism with the rays that pass through the variable-angle prism, so that both sets of rays pass through the same portion of the lens of the eye.

The foregoing and other objects and advantages of this invention will become apparent from the following detailed description of illustrative embodiments and the accompanying drawings.

FIG. 1 of the drawings is a back view of the simpler embodiment.

FIG. 2 is a section taken along the line 2—2 of FIG. 1.

FIG. 3 is an exaggerated, schematic view illustrating lines of sight and showing an enlarged fragmentary section of the simpler embodiment.

FIG. 4 is a schematic illustration of the two images of the same distant object seen by a user of this range finder.

FIG. 6 is a greatly exaggerated, schematic view illustrating elimination of the error by the addition of a combining prism.

FIG. 8 is a section taken along the line 8—8 of FIG. 7.

Figure 5:
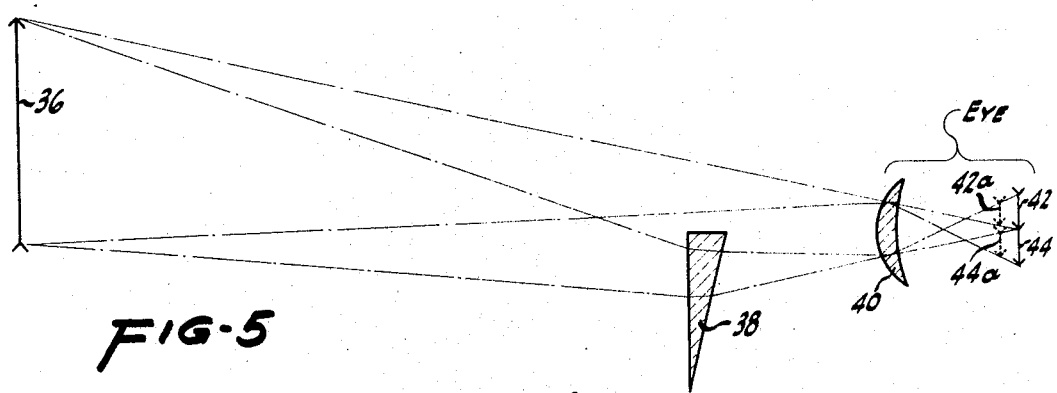
FIG. 5 is a greatly exaggerated, schematic view illustrating a source of error in the simpler embodiment.

Referring particularly to FIGS. 1 and 2, the range finder 10 comprises a flat, circular case 12 of any appropriate material, which may be two to four inches in diameter. The rim and back of the case 12 may be opaque. Set into the back is an opaque, rotatable disk 14, and inside the case is a rotatable disk 16, mounted upon the hub 18 of disk 14 so that the two disks rotate in unison around a central shaft 20, which may be formed by a pin or rivet extending through the center of the case and flattened over a washer 21 which acts as a bearing. The front or face 22 of the case is a flat disk, which in the illustrated embodiment is entirely of transparent plastic but, if desired, could be made principally of opaque material and provided with a hole or window in the region of the sight hole hereinafter described. A logarithmic scale 24 representing distance in yards is marked upon the outside of disk 14, as shown in FIG. 1, and a second logarithmic scale 26 representing height in feet is marked upon an adjacent portion of the case 12, so that the two scales can be read together to give the distance in yards corresponding to any selected height in feet, in accordance with a distance-height ratio determined by the angular position of disk 14 with respect to case 12.

The rim of interior disk 16 is formed into an annular prism 28. Of course, the prism 28 must be of transparent material, but the remainder of disk 16 may be either transparent or opaque, as desired. In the illustrated embodiment, the entire disk 16 is made of transparent plastic. The back of case 12 is provided with a sight hole 30 centered over the outer rim of prism 28, as shown, so that rays of light pass through a small portion of prism 28 at the bottom half of the sight hole, and other rays of light pass through the top half of the sight hole. When the user looks through the sight hole at a distant object, he will see two images, one formed by the light rays that pass through the prism and the other formed by the light rays that pass above the prism. The two images will be displaced vertically from each other by an amount proportional to the bending, or angle of deviation, of the light rays that pass through the prism.

The angle of the prism, hereinbefore designated $\alpha$, is the dihedral angle that would be formed by extending a portion of the beveled back surface of prism 28 to intersect the plane of the flat front surface of the prism. For small angles, the amount of bending, or angle of deviation, of a light ray passing through the prism is proportional to the angle of the prism. Lengthwise of the circular outside edge of the prism, angle $\alpha$ varies as an exponential function of distance such that, in passing completely around the disk 16, the angle of the prism varies by a factor of 10. Thus, the angle of deviation of light rays passing through the prism can be varied by a factor of 10, and the distance-height ratio indicated by cooperating scales 24 and 26 can be adjusted by a like ratio, through a 360° rotation of disk 14 relative to case 12. This scale arrangement makes the range finder very versatile. For example, if the setting shown in FIG. 1 is obtained from observation of a distant tower known to be 300 feet high, a distance of 6,000 yards is ascertained by reading 60 on the distance scale opposite 30 on the height scale, and making the obvious correction of the decimal point, as in reading a slide rule.

Referring now to FIGS. 3 and 4, which are greatly exaggerated and not to scale, a flag which marks the location of a distant hole on a golf course is represented at 32, the eye of a user is represented at 34, and a fragment of the range finder, greatly exaggerated in size, is represented by the parts numbered 12, 16, 22, 28 and 30. The broken lines represent light rays traveling from the distant flag 32 to the eye 34. The rays that pass above prism 28 are not deflected, and upon entering the eye these rays form an image upon the retina which the user sees as a flag in the normal position 32a, FIG. 4. The light rays from flag 32 that pass through the prism 28 are bent upward by the prism, and upon entering the eye form a second image upon the retina above the first image. Thus, the user sees a second flag positioned at 32b, FIG. 4. The vertical displacement between the two images is proportional to the angle of deviation of the light rays passing through the prism. By rotating disk 14 different portions of the prism are brought into alignment with sight hole 30, thus varying the effective angle of the prism and varying the amount of displacement between the two images 32a and 32b.

In the use of this range finder, the user rotates disk 14 until the foot of flag 32a seems to touch the head of flag 32b. At this point the displacement between the two images is equal to the height of one image, and the cooperating scales 24 and 26 clearly indicate the ratio of distance to height of the object under observation. Hence, if the height is known, the distance can be read immediately and directly from the scales. The measurement is quite accurate, because the base line of the triangle employed to measure the distance is the height of the distance object, which is typically in the range of four feet or more. Thus, much greater accuracy is possible than can be obtained in optical range finders of the type customarily used for photography, wherein the base line is the distance—typically a few inches—between optical elements within the range finder itself.

FIG. 5 illustrates a source of error which may sometimes be encountered with the simpler embodiment of this invention. In FIG. 5, the arrow 36 represents a distant object, the variable-angle prism of the range finder is represented at 38, the lens of the user's eye is represented at 40, and the two images formed upon the retina of the eye are represented by the arrows 42 and 44. The broken lines represent typical light rays. It will be appreciated that the drawing is not to scale, and that angles are greatly exaggerated—in the actual range finder the light rays will be much more nearly parallel. It will be observed from FIG. 5 that light rays passing above prism 38, which form image 44, pass through the upper portion of the eye's lens 40, while light rays passing through the prism 38, which form image 42, pass through the lower portion of lens 40. If the eye were a fixed-focus device, as it may be in older people whose eyes have lost their accommodation, this would present no problem, particularly if the range finder were calibrated for a specified user. However, the young normal eye has a wide range of accommodation, and this introduces a difficulty. Assume, for example, that the focus of the eye changes such that the position of the focal plane relative to the retina moves the images from the positions shown by arrows 42 and 44 to the positions shown by broken-line arrows 42a and 44a. This may represent only a slight defocusing, and the images may appear fairly clear and distinct. Note, however, that the ends of the two arrows have moved apart as a result of the change in focus of the eye, without any other change in the optical system. The user will correct this by adjusting the range finder to change the angle of prism 38 sufficiently to bring the two arrows 42a and 44a together. This may give a somewhat erroneous reading of the distance from the observer to object 36.

By adding a combining prism—that is, a beam-splitter prism used in the reverse sense—to the range finder, the error can be completely avoided. Referring to FIG. 6, also not to scale and with angles greatly exaggerated, a combining prism 46 has been added to the optical system, as shown. This prism has two parallel faces 46a and 46b, disposed at an angle of about 45° to the line of sight, as illustrated. The upper part of face 46b is silvered to form a 100% mirrored surface—that is, the light that reaches this surface is almost totally reflected. The lower portion of the surface of prism face 46a is half-silvered, to make a 50% mirror—that is, approximately half of the light that reaches this surface is reflected, and approximately half is transmitted through the surface. The art of coating surfaces to produce these characteristics is well known, and need not be described here.

Light rays from distant object 36 that pass above the top edge of variable-angle prism 38 enter prism 46 through the upper, unsilvered portion of face 46a, are bent upward by an amount depending upon the angle of incidence of the light rays and the refractive index of the prism material, and proceed to the totally reflecting upper surface of face 46b. These rays are then reflected downward, as indicated by the broken lines within the prism, to the 50% reflecting lower portion of face 46a, from which about half the light is reflected within the prism and passes through the unsilvered lower portion of face 46b to lens 40 of the user's eye. The lens focusses this light upon the retina to form image 44.

Light from object 36 that passes through variable-angle prism 38 is bent by the prism and directed onto the 50% reflecting lower portion of face 46a of the combining prism 46. Approximately half of the light enters the prism, is bent upward by an amount depending upon the angle of incidence of the light and the refractive index of the prism material, leaves the prism through the unsilvered lower portion of face 46b and is directed into the same portion of lens 40 of the observer's eye that receives the first set of rays, which did not pass through the variable-angle prism 38. Because of the different directions of the two sets of light rays entering lens 40, the lens of the eye focusses them into two separate images 42 and 44 in essentially the same manner as in the embodiment that lacked prism 46. However, on comparing the optical systems shown in FIGS. 5 and 6 it will be noticed that the separation of the two images in FIG. 6, or rather their lack of separation, is not dependent upon the focus of the eye, whereas in FIG. 5 it is. Hence, the system shown in FIG. 6 will not give different readings when the focus of the eye changes.

Figure 7:
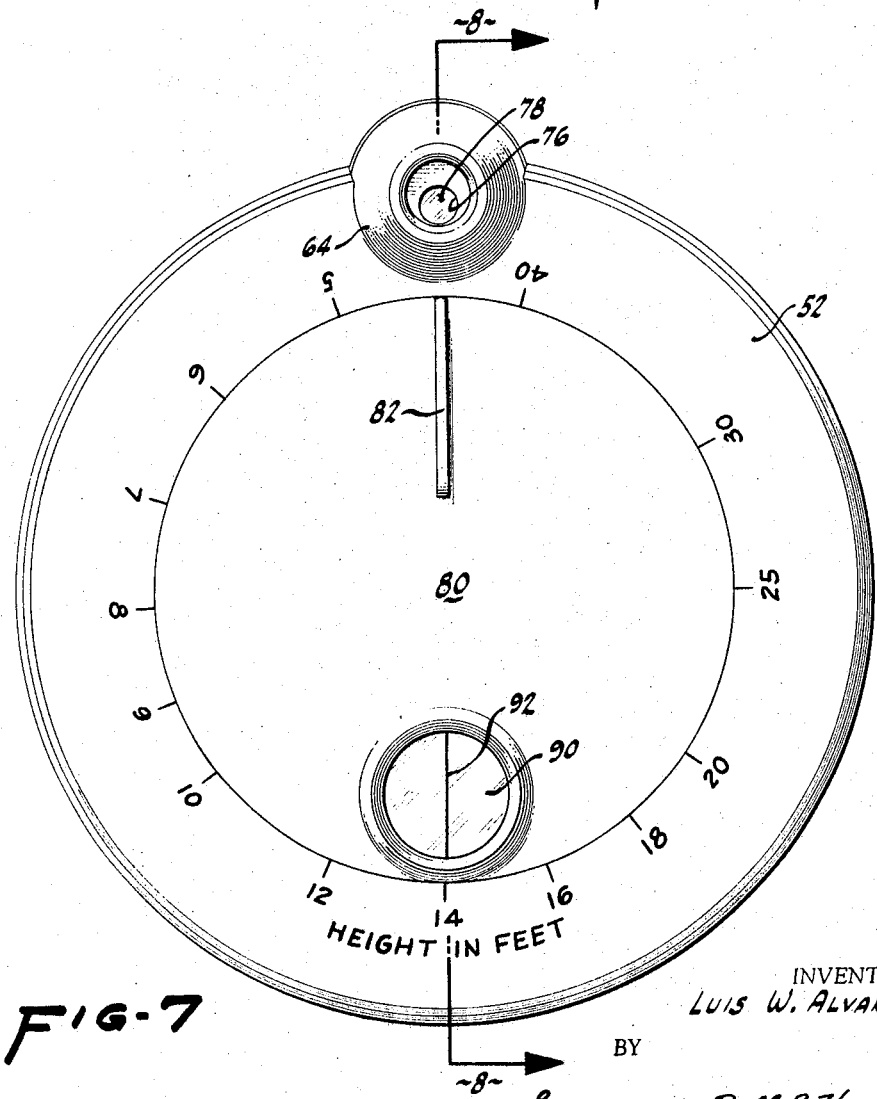
FIG. 7 is a back view of a preferred embodiment incorporating the combining prism.

Reference is now made to FIGS. 7 and 8, illustrating a preferred embodiment of the invention incorporating a combining prism for the purposes explained in connection with FIG. 6. This range finder comprises a case, which for convenience of manufacture and assembly may be made up of a front portion 50 and a rear portion 52 fastened together in immovable relation to each other. A rotatable inner disk 54 has a shaft 54a that extends through the front of the case and is attached to a knob 56 by means of a screw 58, so that rotation of the knob 56 on the front of the range finder rotates the inner disk 54. An O-ring 60 is provided as seal to keep dirt out.

Mounted on the rim of disk 54 is an annular prism 62 made of transparent plastic material, or the like, and formed with an angle that varies as an exponential function of distance around the circumference of the disk 54. Thus, prism 62 is generally similar to prism 28 of the first embodiment herein described. The sight comprises a somewhat cylindrical housing 64 extending backward from the rear of the case, and a somewhat cylindrical housing 66 extending forward from the front of the case. Housing 66 may be provided with a sunshade 66a as indicated, and with a cover glass 68 to exclude dirt. Two parallel holes 70 and 72 extend through housing 66 to admit one set of light rays along a path that passes above the outer edge of prism 62, and another set of light rays that pass through prism 62. These two passages have a substantial length relative to their widths, so that they will admit only light rays traveling approximately parallel to the line of sight. Because of the considerable distance of objects to be observed at the ranges for which this range finder is intended, all useful rays of light will be sufficiently parallel to pass through these collimating passages 70 and 72. By excluding other rays, the amount of glare is reduced, and clearer images of the observed object can be obtained.

The two sets of light rays, one passing above variable-angle prism 62 and the other passing through prism 62, enter the front face of combining prism 74, which serves the same function as the prism 46 illustrated in FIG. 6. Prism 74 combines the two sets of rays, which then emerge together from the lower portion of the rear face of the prism and pass through an opening 76 at the rear of housing 64. Glass or plastic window 78 may be provided over opening 76 to exclude dirt.

Set into the back face of the case is a rotatable disk 80, which may be provided with one or more lugs 82 to facilitate rotation of disk 80 relative to the case. Spring 84 presses disk 54 forward and disk 80 backward, and thus maintains the position of both within the case. A spring 86 assists in holding disk 80 fixed in a set position, and prevents undesired accidental rotations of the disk. A ring 88 mounted on the back side of inner disk 54 has a logarithmic scale of distances marked thereon. This scale is observed through a magnifying glass 90 marked with a hairline 92 set into disk 80, as shown, whereby the distance scale can be read easily and with considerable accuracy. A logarithmic scale of heights is marked upon the back of case 52, as indicated in FIG. 7.

To use the range finder illustrated in FIGS. 7 and 8, disk 80 is rotated until the hairline 92, or other indicia which may be provided upon disk 80, is aligned with the marking on the height scale corresponding to the known or estimated height of the distant object that is to be observed. Then the range finder is held close to the eye and the user looks through hole 76, sighting on the distant object. Knob 56 is then turned to adjust the position of the variable-angle prism relative to the sight, as hereinbefore explained, until the two images seen by the observer just come together, with the foot of one image touching the head of the other. Then, without changing any of the settings, the user notes the distance indicated on scale 88 as viewed through magnifying glass 90 with the assistance of hairline 92.

In its broader aspects this invention is not limited to the specific embodiments illustrated and described, all intended limitations being expressed in the appended claims.

What is claimed is:

1. An optical range finder for determining distance to an observed object having a known dimension and adapted to be held to the eye of a viewer, the range finder comprising
   (a) a prism having an angle between its faces that varies as an exponential function of distance along an edge of the prism, such angle being oriented substantially perpendicular to such edge,
   (b) a sight of limited opening arranged in alignment with such edge for viewing the observed object through a portion of said prism and simultaneously viewing the same object without the intervention of said prism, the sight being movable with respect to the prism along a direction in which the angle of the prism varies,
   (c) a pair of cooperating logarithmic scales, movable with respect to each other, relating distance to the known dimension of the observed object, in accordance with a ratio that varies with the position of one scale relative to the other, and
   (d) means connecting one scale to said prism and one scale to said sight for relative scale movement with the movement of said sight relative to said prism.

2. A range finder for distant objects comprising
   (a) a reference portion and a rotatable portion,
   (b) an elongate, arcuate prism in said rotatable portion,
   (c) viewing means in said reference portion arranged for sighting directly at an object and simultaneously through a restricted portion of said prism, and
   (d) an arcuate, logarithmic scale in said rotatable portion representative of distances to such objects and a cooperating logarithmic scale of object dimensions about said reference portion, (e) said prism having opposite refracting surfaces of varying relative inclination decreasing progressively as an exponential function of distance along the arcuate length of said prism.

3. An optical range finder for determining distances to an observed object having a known dimension, the range finder comprising
   (a) a variable-angle prism having an angle between its faces that varies as an exponential function of a distance on the prism,
   (b) a combining element comprising a reversed beam splitter and arranged for combining light rays from the observed object that pass through a portion of the variable-angle prism with rays from the same object that do not pass through such portion, the combining element being movable with respect to the variable-angle prism along a direction in which the angle of the prism varies, and
   (c) first and second circular logarithmic scales disposed with one about the other and one marked in object dimensions and the other in object distance, and
   (d) means directly connecting the first scale to said annular prism and the second scale to said combining prism for relative scale movement with prism movement.

4. An optical range finder for determining distance to an observed object having a known dimension, the range finder comprising
   (a) an annular prism having a radially oriented angle between its faces that varies as an exponential function of distance around the annulus,
   (b) a combining prism disposed in alignment with an edge of said annular prism and extending past such edge for relatively translating into juxtaposition light rays directly from an observed object and light rays from the same object passing through a small circumferential portion of the annular prism,
   (c) means for rotating the annular prism relative to the combining prism for varying the effective angle of the annular prism by moving different portions of the annular prism into alignment with the combining prism,
   (d) first and second circular logarithmic scales disposed adjacent each other with one scale marked in object dimensions and the other in object distances, and
   (e) means directly connecting one of said scales to said annular prism and the other to said combining prism for relative scale movement with movement of the prisms whereby distance is directly indicated on one scale adjacent the object dimension on the other by relatively moving said prisms and scales until an object is viewed directly on top of itself through the combining prism.

5. An optical range finder for determining distance to a distant observed object having a known dimension, the range finder comprising
   (a) an annular prism having a radially oriented angle between its faces that varies as an exponential function of distance abound the annulus, there being a substantially ten-fold increase of such angle over the whole distance around the annulus,
   (b) a sight comprising a limited viewing aperature arranged in alignment with an edge of the annular prism for viewing the observed object through a portion of said prism and simultaneously viewing the same object without the intervention of said prism,
   (c) means for rotating the annular prism relative to the sight for varying the effective angle of the prism by moving different portions of the prism into alignment with the sight,
   (d) a pair of cooperating logarithmic circular scales relating distance to the known dimension of the observed object in accordance with a ratio that varies with the position of one scale relative to the other, the whole distance around each such circular scale covering a ten to one range of values, and
   (e) means directly connecting one of said scales to said sight and the other to said annular prism for relative scale movement with prism movement.

References Cited by the Examiner
UNITED STATES PATENTS

| | | | |
|---|---|---|---|
| 1,088,701 | 3/1914 | Humbrecht | 88—2.4 |
| 1,246,230 | 11/1917 | Campbell | 88—2.4 |
| 1,257,765 | 2/1918 | Taylor et al. | 88—2.4 |
| 1,719,552 | 7/1929 | Karnes | 88—2.4 |
| 1,803,224 | 4/1931 | Waltman et al. | 88—2.7 |
| 2,262,100 | 11/1941 | French | 88—2.7 |

FOREIGN PATENTS

| | | |
|---|---|---|
| 299,646 | 9/1919 | Germany. |
| 299,124 | 10/1920 | Germany. |
| 804,888 | 5/1951 | Germany. |

DAVID H. RUBIN, *Primary Examiner.*